RITTERHOFF & COLQUITT.

Tobacco Cutting Machine.

No. 1,903. Reissued March 14, 1865.

Witnesses.

Jas Whitelaw

Geo. W. Reed

Inventors.

F. W. Ritterhoff

L. A. Colquitt

N. PETERS, Photo-Lithographer, Washington, D. C.

UNITED STATES PATENT OFFICE.

F. W. RITTERHOFF, C. A. COLQUITT, AND WM. MULCHAHEY, OF NEW YORK, N. Y., ASSIGNEES OF RITTERHOFF AND COLQUITT.

IMPROVED MACHINE FOR CUTTING TOBACCO.

Specification forming part of Letters Patent No. 41,721, dated February 23, 1864; Reissue No. 1,903, dated March 14, 1865.

*To all whom it may concern:*

Be it known that we, F. W. RITTERHOFF, C. A. COLQUITT, and WM. MULCHAHEY, of the city, county, and State of New York, have invented a new and Improved Machine for Cutting Tobacco; and we do hereby declare that the following is a full, clear, and exact description thereof, which will enable those skilled in the art to make and use the same, reference being had to the accompanying drawings, forming part of this specification, in which—

Figure 1:
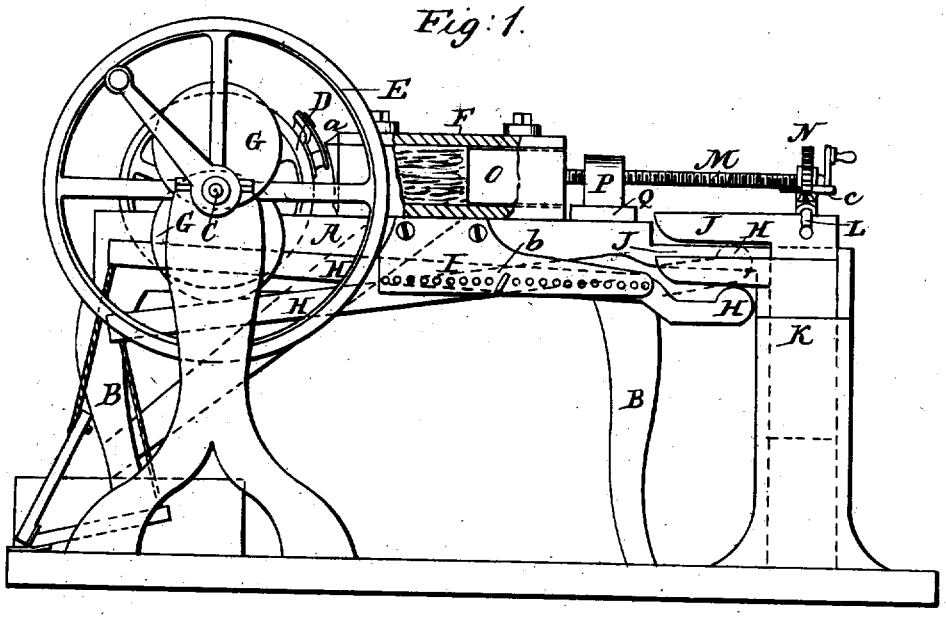
Figure 2:
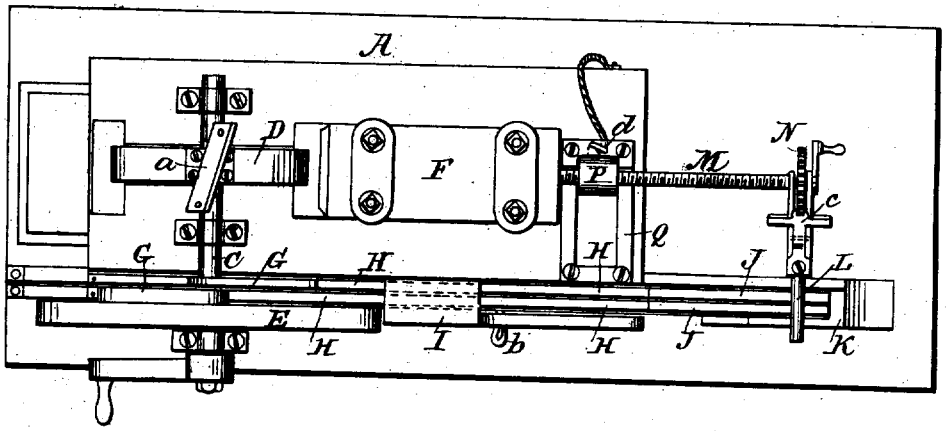

Figure 1 represents a sectional side elevation of this invention. Fig. 2 is a plan or top view of the same.

Similar letters of reference indicate corresponding parts.

The object of this machine is to produce a simple, cheap, and compact machine for cutting tobacco or other material or materials of any desired fineness, so that every small manufacturer is enabled to cut up his own tobacco to suit himself and his customers.

The invention consists in a lever-catch, which acts on the teeth of a ratchet-wheel secured to the end of a screw-spindle, which imparts motion to the follower moving in a suitable box, and through it to the tobacco or other material to be cut, in combination with one or more eccentrics secured to the driving-shaft of the cutting-wheel, or to any other shaft receiving motion from said driving-shaft, in such a manner that for each revolution of the eccentrics the follower is propelled a certain distance, depending upon the throw of said eccentrics, and an intermittent feed motion is imparted to the tobacco or other material in the box.

The invention consists, also, in the use of one or more adjustable levers, in combination with the eccentrics on the driving-shaft, and with the lever-catch which imparts motion to the follower, in such a manner that by shifting the fulcrum or fulcra of the lever or levers the amount of feed can be regulated and the tobacco or other material can be cut finer or coarser at pleasure.

The invention consists, also, in combining one or more rising and falling tappets with the eccentrics, the lever-catch, and the adjustable levers in such a manner that the ends of the levers will strike the tappets and act through them on the lever-catch, whatever the position of their fulcra.

The invention consists, finally, in the employment or use of a laterally-sliding nut, in combination with the screw-spindle, follower, and box, in such a manner that by imparting to said nut a lateral motion the end of the box is thrown open for the purpose of removing the follower and introducing a fresh charge of tobacco or other material to be cut.

A represents a frame, made of wood or other suitable material, and supported by legs B. This frame forms the bearings for the driving-shaft C, to which a rotary motion is imparted by hand or any other competent power. This shaft carries the cutter-wheel D, and, if desired, an additional fly-wheel, E, for the purpose of equalizing the motion. The cutters *a* are secured to the wheel D in the usual manner, and they sweep down close to the front end of the box F, through which tobacco or other material to be cut is fed to said cutters. The number of cutters may be varied according to the size of the cutter-wheel.

In the drawings we have shown two cutters, but instead of two only one, or three or more, might be used. The feed motion is effected by the action of two (more or less) eccentrics or cams, G, which are secured to the driving-shaft C. The number and position of these eccentrics correspond to the number and position of the cutters on the wheel D, so that whenever one of the cutters has done its work one of the eccentrics is brought in action, and the tobacco or other material to be cut is fed along the desired distance before the next succeeding cutter takes effect. The eccentrics G impart motion to a lever-catch, L, which is hinged to the end of the screw-spindle M, and which carries a pawl, *c*, that engages with the teeth of a ratchet-wheel, N, secured to the end of said screw-spindle. By the action of the eccentrics on the lever-catch an intermittent rotary motion is imparted to the screw-spindle, and through it to the follower O, which fits into the box F, and serves to feed the tobacco or other material toward the cutter-wheel. The motion of the eccentrics G is transmitted to the lever-catch L by means of levers H, which are pivoted to the side of the frame A by means of a pin, *b*, which is adjustable in a bracket with a large number of holes, each of the levers being provided with a similar number of holes, so that their fulcrum can be changed and the motion produced by the cams G can be varied at pleasure. The motion of the levers H is transmitted to rising and falling tappets J, which are guided in a slotted standard K, at or near the rear end of the frame A, and these tappets impart motion to a lever-catch, L. The screw-spindle M screws into a nut, P, which is adjustable in a slotted bed-plate, Q, so that a lateral motion can be given to it whenever it may be desired to remove the follower or to have free access to the end of the box F. During the operation of the machine, the nut P is secured in its place by a pin, *d*. It must be remarked, however, that instead of making the nut stationary said nut might be secured to the follower or made a part of the same, and in this case the screw-spindle would have to be so arranged that it could rotate freely without being allowed to move in a longitudinal direction. The amount of the feed motion, and consequently the fineness of the cut material, depends upon the throw of the eccentrics and upon the position of the fulcrum-pins *b* of the levers H; and by changing this pin the fineness of the cut can be varied at pleasure. The changes to be effected in the feed motion may, however, be still further increased by attaching a series of gear-wheels to the end of the screw-spindle, similar to the back gear of a turning-lathe.

This machine is very simple in its construction, and it will enable every small manufacturer of cigars, or dealer, to cut up his own tobacco to suit himself.

It is obvious that our machine may be used for cutting other materials besides tobacco.

We claim as new and desire to secure by Letters Patent—

1. The lever-catch L, applied in combination with the spindle M, of the follower O, and with one or more eccentrics, G, substantially as and for the purpose set forth.

2. The adjustable levers H, in combination with the lever-catch L, eccentrics G, and follower O, constructed and operating substantially as and for the purpose specified.

3. The tappets J, in combination with the adjustable levers H, lever-catch L, eccentrics G, and follower O, constructed and operating substantially as and for the purpose described.

4. The movable nut P, in combination with the spindle M and box F, constructed and operating in the manner and for the purpose substantially as set forth.

F. W. RITTERHOFF.
C. A. COLQUITT.
WM. MULCHAHEY.

Witnesses:
M. M. LIVINGSTON,
C. L. TOPLIFF.